United States Patent [19]

Moss et al.

[11] Patent Number: 4,523,984

[45] Date of Patent: Jun. 18, 1985

[54] TREATMENT OF ION-EXCHANGE MEMBRANE

[75] Inventors: Keith G. Moss; Peter J. Smith, both of Cheshire; Robin A. Woolhouse, Bunbury Nr. Tarporley, all of England

[73] Assignee: Imperial Chemical Industries, PLC, London, England

[21] Appl. No.: 501,759

[22] Filed: Jun. 6, 1983

[30] Foreign Application Priority Data

Jun. 8, 1982 [GB] United Kingdom ............... 8216559

[51] Int. Cl.$^3$ ............................................. C25B 13/00
[52] U.S. Cl. ..................................... 204/296; 204/98
[58] Field of Search .................................. 204/296, 98

[56] References Cited

U.S. PATENT DOCUMENTS 4,000,057 12/1976 Mrazek et al. ..................... 204/296

FOREIGN PATENT DOCUMENTS 1547534 4/1977 United Kingdom .

Primary Examiner—John F. Niebling
Attorney, Agent, or Firm—Cushman, Darby & Cushman

[57] ABSTRACT

Treating a sheet of ion-exchange membrane in order to decrease the voltage of operation of an electrolytic cell containing the membrane by swelling the membrane in a liquid medium, the extent of swelling on the anode side being greater than the extent of swelling on the cathode side, and the extent of swelling on the anode side being greater than that effected by contacting the membrane with the electrolyte to be electrolyzed.

11 Claims, No Drawings

TREATMENT OF ION-EXCHANGE MEMBRANE

This invention relates to a method of treating an ion-exchange membrane, and in particular to a method of treating an ion-exchange membrane in order to reduce the voltage of operation of an electrolytic cell in which the ion-exchange membrane is installed.

Electrolytic cells are known comprising a plurality of anodes and cathodes with each anode being separated from the adjacent cathode by an ion-exchange membrane which divides the electrolytic cell into a plurality of anode and cathode compartments. The anode compartments of such a cell are provided with means for feeding electrolyte to the cell, suitably from a common header, and with means for removing products of electrolysis from the cell. Similarly, the cathode compartments of the cell are provided with means for removing products of electrolysis from the cell, and optionally with means for feeding water or other fluid to the cell.

A number of different types of electrolytic cell are known. For example electrolytic cells of the filter press type may comprise a large number of alternating anodes and cathodes, for example, fifty anodes alternating with fifty cathodes, although the cell may comprise even more anodes and cathodes, for example up to one hundred and fifty alternating anodes and cathodes.

In such an electrolytic cell the membranes are essentially hydraulically impermeable and in use ionic species, e.g hydrated ionic species, are transported across the membrane between the anode and cathode compartments of the cell. Thus, when an aqueous alkali metal chloride solution is electrolysed in a cell equipped with cation-exchange membranes the solution is fed to the anode compartments of the cell and chlorine produced in the electrolysis and depleted alkali metal chloride solution are removed from the anode compartments, alkali metal ions are transported across the membranes to the cathode compartments of the cell to which water or dilute alkali metal hydroxide solution may be fed, and hydrogen and alkali metal hydroxide solution produced by the reaction of alkali metal ions with hydroxyl ions are removed from the cathode compartments of the cell.

Electrolytic cells of the type described may be used particularly in the production of chlorine and sodium hydroxide by the electrolysis of aqueous sodium chloride solution, although the method of the present invention may be applied to ion-exchange membranes for use in electrolytic cells in which other electrolytes are to be electrolysed.

A major objective in the operation of such electrolytic cells is to reduce the voltage of operation of the cell at a given anode current density, and thus to decrease the electrical power required to produce a given quantity of the products of electrolysis.

Thus, in the electrolysis of alkali metal chloride solution it has been proposed to coat the anodes of the cell with a material which reduces the chlorine overpotential on the anode. It has also been proposed to coat the cathodes of the cell with a material which reduces the hydrogen overpotential at the cathodes, and it has also been proposed to operate such cells with a small, or zero, anode-cathode gap, in order to reduce the resistance of the electrolyte in the cell.

The present invention relates to a method of treating an ion-exchange membrane in order to reduce the voltage of operation of an electrolytic cell in which the ion-exchange membrane is installed.

According to the present invention there is provided a method of treating a sheet of an ion-exchange membrane, or a precursor for said ion-exchange membrane, in which method the sheet is swollen by contacting the sheet with a liquid medium, characterised in that after swelling the sheet with liquid medium the liquid medium is replaced in the sheet by contacting the thus swollen sheet with the electrolyte to be electrolysed, in that the sheet is swollen by the liquid medium at or near a first face to an extent greater than the sheet is swollen by the liquid medium at or near a second face, and in that the extent of swelling at or near said first face is greater than the extent of swelling which would be effected by contacting the sheet with the electrolyte to be electrolysed.

The ion-exchange membrane will generally be a cation-exchange membrane, or a precursor therefor, which is capable of transferring cationic species between the anode and cathode compartments of an electrolytic cell.

In the method of the invention it is essential that the sheet of ion-exchange membrane, hereinafter referred to as the membrane, is swollen by the liquid medium at or near a first face to an extent greater than the extent of swelling which would be effected by contacting the membrane with the electrolyte to be electrolysed in the electrolytic cell.

Suitable liquid media, and conditions of use, for example temperature, may be selected by means of a simple test. Thus, an essentially dry sheet of membrane of known dimensions may be immersed in the chosen liquid medium at the chosen temperature in order to swell the sheet and its equilibrium dimensions may be measured. Similarly, an essentially dry sheet of membrane of the same dimensions may be immersed in the electrolyte to be electrolysed at the temperature of operation of the cell and the equilibrium dimensions of the swollen sheet may be measured. The extent of swelling produced by contact with the liquid medium should be greater than that produced by contact with the electrolyte.

It is also an essential feature of the method of the invention that the sheet of membrane is swollen by the liquid medium at or near a first face to an extent greater than the sheet is swollen at or near a second face. Thus, the extent of swelling produced by contacting the sheet with liquid medium decreases through the thickness of the membrane from a first face to a second face. Indeed, it is preferred, because of the reduction of voltage thereby obtained in use, that the sheet is swollen by the liquid medium at or near a first face and is essentially unswollen by the liquid medium at or near a second face.

It is essential that the sheet is not swollen by liquid medium to the same extent throughout the thickness of the membrane otherwise the advantage of reduced voltage of operation of the electrolytic cell in which membrane is installed will not be obtained. This differential swelling of the membrane sheet in the method of the invention distinguishes the method from the known prior art in which a membrane sheet is swollen by contact with a liquid medium.

Thus, in U.S. Pat. No. 4,000,057 it has been proposed to swell a membrane in a liquid medium in which the membrane exhibits a substantially flat expansion versus time curve for at least four hours after completion of the immersion in the liquid medium. The swollen membrane is installed in an electrolytic cell and the membrane becomes taut when the liquid medium is removed from it.

In British Pat. No. 1,547,534 it has been proposed to improve the current efficiency of a cation-exchange membrane by swelling the cation-exchange membrane with a water-miscible organic solvent and then removing the organic solvent from the swollen membrane.

In the method of the invention the membrane sheet is swollen, for example by contacting a first face of the sheet with the liquid medium and the thus swollen membrane is contacted with the electrolyte to be electrolysed before the swollen membrane contracts due to evaporation of the liquid medium.

The swollen membrane may be contacted with liquid medium and the thus swollen membrane may then be installed in the electrolytic cell. However, for ease of operation and in order to avoid the problems associated with the handling of wet membrane, it is preferred to install the membrane in the electrolytic cell prior to contact with the liquid medium, then to swell the membrane by contacting the membrane with the liquid medium, and finally to contact the swollen membrane with the electrolyte to be electrolysed.

In order to obtain the benefit of reduced voltage of operation the more swollen first face of the membrane sheet should be positioned facing the anode of the electrolytic cell. Thus, in the preferred method of the invention the membrane, when installed in the electrolytic cell, may be contacted with liquid medium by charging the liquid medium to the anode compartment(s) of the cell and, after swelling has been effected, the liquid medium may be removed from the anode compartment(s) and be replaced by the electrolyte to be electrolysed.

Carrying out the method of the invention with the membrane sheet installed in the electrolytic cell provides a convenient means of controlling the differential swelling of the membrane. Thus, the chosen liquid medium may be charged to the anode compartment(s) of the electrolytic cell and contacted with a first face of the membrane sheet, and a further liquid may be charged to the cathode compartment(s) of the electrolytic cell and contacted with a second face of the membrane sheet, the further liquid being capable of swelling the membrane to a extent less than the chosen liquid medium.

In the case where aqueous alkali metal chloride is to be electrolysed the further liquid is suitably an aqueous solution of an alkali metal hydroxide.

In the method of the invention it is preferred that the membrane sheet is swollen by the liquid medium at or near a first face of the sheet to an extent of at least 20%, more preferably at least 50%, more than the extent by which the membrane would be swollen by the electrolyte to be electrolysed in the cell.

The membrane is preferably a cation-exchange membrane containing acidic groups or precursors therefor convertible to acidic groups. In order to provide resistance to the corrosive environment encountered in many electrolytic cells, particularly in chlor-alkali cell, the membrane is preferably a fluoropolymer and more preferably a perfluoropolymer, containing such acidic groups or derivatives thereof.

Suitable acidic groups include sulphonic acid, carboxylic acid or phosphonic acid groups. The membrane may contain two or more different acidic groups. Suitable precursors include, in particular, groups convertible to acidic groups by hydrolysis, for example acid halide groups, e.g —$SO_2F$ and —COF, nitrile groups —CN, acid amide groups —$CONR_2$, where R is H or alkyl, and acid ester groups, e.g —COOR, where R is an alkyl group.

Suitable cation-exchange membranes are those described, for example, in the Great Britain Pat. Nos. 1,184,321, 1,402,920, 1,406,673, 1,455,070, 1,497,748, 1,497,749, 1,518,387 and 1,531,068.

The membrane may be reinforced, for example with a net of a fluoropolymer, it may be in the form of a laminate, or it may be coated with electrode or non-electrode materials.

The membrane in the form of a sheet may, for example, have a thickness in the range 0.05 to 2 mm. Although the membrane is described as being a sheet it is not necessarily in a planar form. The sheet may have a relatively complex shape, especially when installed in an electrolytic cell.

The choice of liquid medium to be used in the method of the invention will be dependent on the electrolyte to be electrolysed in the electrolytic cell as the liquid medium must swell the membrane at or near a first face of the membrane sheet to an extent greater than the extent of swelling which would be effected by contacting the sheet with the electrolyte to be electrolysed.

The liquid medium is preferably miscible with water in the case where an aqueous electrolyte is to be electrolysed.

Where the electrolyte is an aqueous solution of an alkali metal chloride, for example an aqueous solution of sodium chloride, the liquid medium may itself be an aqueous solution. For example, where aqueous sodium chloride solution is to be electrolysed the liquid medium may be an aqueous solution of lithium chloride. The lithium chloride solution may for example be of a concentration of approximately 1N and the solution may be at elevated temperature, e.g. 80° C. to 100° C., during the swelling step.

The liquid medium may be water, e.g. at a temperature of 80° C. to 100° C., or dilute aqueous sodium hydroxide solution.

The liquid medium may be an organic compound, or an aqueous solution of an organic compound. Thus, the liquid medium may be an organic compound containing one or more alcohol groups. The organic compound may be an alcohol, e.g. methanol, ethanol, propanol, or a higher alcohol, or it may be a glycol, e.g. ethylene glycol or propylene glycol, or it may be an aqueous solution thereof. The liquid medium may comprise a plurality of compounds.

The method of the invention may be effected after the membrane has been installed in an electrolytic cell and after an electrolyte has been electrolysed therein. For example, after electrolysis has proceeded the electrical power to such a cell may be switched off, the electrolyte removed from the anode compartment(s) of the cell, the liquid medium charged to the anode compartment(s) of the cell and the desired swelling of the membrane effected, and finally the liquid medium may be removed from the anode compartment(s) of the cell and the electrolyte charged thereto.

Where the method of the invention is effected with the membrane sheet installed in an electrolytic cell the extent of the swelling at or near the anode side of the membrane is greater than the extent of the swelling at or near the cathode side of the membrane with the result that the membrane tends to assume a position nearer to the anodes of the electrolytic cell and further away from the cathodes of the electrolytic cell.

The method of the present invention is particularly suitable for application to an ion-exchange membrane for use in an electrolytic cell of the filter press type, although it is not limited to use with ion-exchange membranes for use in cells of this type. Electrolytic cells of the filter press type may comprise a large number of alternating anodes and cathodes with an ion-exchange membrane positioned between each anode and adjacent cathode. Such cells may comprise, for example, fifty anodes alternating with fifty cathodes, although the cell may comprise even more anodes and cathodes, for example up to one hundred and fifty alternating anodes and cathodes.

In the electrolytic cell the electrode will generally be made of a metal or alloy. The nature of the metal or alloy will depend on whether the electrode is to be used as an anode or cathode and on the nature of the electrolyte which is to be electrolysed in the cell.

Where aqueous alkali metal chloride solution is to be electrolysed and the electrode is to be used as an anode the electrode is suitably made of a film-forming metal or an alloy thereof, for example of zirconium, niobium, tungsten or tantalum, but preferably is made of titanium, and the surface of the anode suitably carries a coating of an electro-conducting electrocatalytically active material. The coating may comprise one or more platinum group metals, that is platinum, rhodium, iridium, ruthenium, osmium or palladium, and/or an oxide of one or more of these metals. The coating of platinum group metal and/or oxide may be present in admixture with one or more non-noble metal oxides, particularly one or more film-forming metal oxides, e.g. titanium dioxide. Electro-conducting electrocatalytically active materials for use as anode coatings in an electrolytic cell for the electrolysis of aqueous alkali metal chloride solution, and methods of application of such coatings, are well known in the art.

Where aqueous alkali metal chloride solution is to be electrolysed and the electrode is to be used as a cathode, the electrode is suitably made of iron or steel, or of other suitable metal, for example nickel. The cathode may be coated with a material designed to reduce the hydrogen overpotential of the electrolysis.

Any suitable construction of electrode may be used in the electrolytic cell. For example the electrode may comprise a plurality of elongated members, e.g rods or strips, or it may comprise a foraminate surface, e.g a perforated plate, a mesh, or an expanded metal.

The invention is illustrated by the following examples.

EXAMPLE 1

A 300 micron thick sheet of a perfluorinated polymer containing carboxylic acid ester groups was immersed in a 25% by weight aqueous solution of sodium hydroxide at a temperature of 90° C. for 16 hours in order to hydrolyse the carboxylic acid ester groups to the sodium carboxylate form.

The thus hydrolysed membrane was installed in an electrolytic cell equipped with a nickel mesh cathode and with a titanium mesh anode the surface of which was coated with a layer of a mixture of $RuO_2$ and $TiO_2$ in a proportion by weight of $RuO_2:TiO_2$ 35.65.

310 g/l aqueous NaCl solution at a pH of 8.0 was charged to the anode compartment of the cell and water was charged to the cathode compartment of the cell and the NaCl was electrolysed therein at a temperature of 90° C.

Chlorine and depleted NaCl solution were removed from the anode compartment and hydrogen and aqueous NaOH (35% by eight) were removed from the cathode compartment.

The electrolysis was effected at a current density of 3 $kA/m^2$. The voltage was 3.4 volts.

After 20 days electrolysis was discontinued, the NaCl solution was drained from the anode compartment of the cell, and the anode compartment was filled with methanol at a temperature of 40° C., the NaOH solution remaining in the cathode compartment. Previous tests have indicated that methanol at 40° C. was capable of swelling the membrane to a greater extent than was the aqueous NaCl solution at 90° C.

After 30 minutes the methanol was drained from the anode compartment and was replaced by 310 g/l aqueous NaCl solution and the electrolysis was recommenced.

When electrolysis was proceeding at a steady voltage the voltage was found to be 120 mV less than the voltage of operation prior to the treatment of the membrane with methanol.

EXAMPLE 2

The procedure of Example 1 was repeated except that a 1N aqueous solution of lithium chloride at a temperature of 90° C. was used in place of the methanol of Example 1, and the lithium chloride solution was contacted with the membrane for 1 hour, treatment with lithium chloride solution at 90° C. swelling the membrane to an extent greater than did NaCl solution at 90° C.

When electrolysis was proceeding at a steady voltage the voltage was found to be 70 mV less than the voltage of operation prior to the treatment of the membrane with lithium chloride solution.

EXAMPLE 3

A membrane as used in Example 1 was mounted on a frame positioned in a container and the side of the membrane which in the electrolytic cell is to face the anode was contacted with 4% by weight aqueous sodium hydroxide solution at a temperature of 60° C. and the cathode side of the membrane was contacted with 25% by weight aqueous sodium hydroxide solution at a temperature of 90° C. This treatment hydrolysed the carboxylic acid ester group of the membrane to the sodium carboxylate form and also caused a differential swelling of the membrane.

4% by weight aqueous sodium hydroxide solution at 60° C. swelled the membrane to an extent greater than did the NaCl solution at 90° C.

After 4 hours the membrane was removed from the container and was installed whilst wet in an electrolytic cell as used in Example 1, and aqueous NaCl solution was electrolysed following the procedure of Example 1.

The voltage of operation of the cell was 50 mV less than the voltage at which a cell operated which contained a membrane in which both sides of the membrane had been contacted with 25% by weight sodium hydroxide solution in order to effect hydrolysis.

EXAMPLE 4

The procedure of Example 1 was repeated except that water at a temperature of 90° C. was used in place of the methanol of Example 1, and the water was contacted with the membrane for 1 hour. Water at 90° C. swelled the membrane to an extent greater than did the NaCl solution at 90° C.

When electrolysis was proceeding at a steady voltage the voltage was found to be 110 mV less than the voltage of operation prior to the treatment of the membrane with methanol.

We claim:

1. A method of treating a sheet of an ion-exchange membrane for use in an electrolytic cell comprising at least one anode and at least one cathode, or a precursor for said ion-exchange membrane, in which method the sheet is swollen by contacting the sheet with a liquid medium, characterised in that after swelling the sheet with liquid medium the liquid medium is replaced in the sheet by contacting the thus swollen sheet with an electrolyte to be electrolysed, in that the sheet is swollen by the liquid medium at or near a first face, which in the electrolytic cell faces the anode, to an extent greater than the sheet is swollen by the liquid medium at or near a second face, which in the electrolytic cell faces the cathode, and in that the extent of swelling at or near said first face is greater than the extent of swelling which would be effected by contacting the sheet with the electrolyte to be electrolysed.

2. A method as claimed in claim 1 characterised in that the ion-exchange membrane is a cation-exchange membrane.

3. A method as claimed in claim 2 characterised in that the ion-exchange membrane sheet is swollen by the liquid medium at or near a first face and is essentially unswollen by the liquid medium at or near a second face.

4. A method as claimed in claim 1, 2 or 3 characterised in that ion-exchange membrane sheet is swollen by contacting a first face of the sheet with the liquid medium.

5. A method as claimed in claim 1 characterised in that the ion-exchange membrane sheet is installed in an electrolytic cell prior to contact of the sheet with the liquid medium.

6. A method as claimed in claim 5 characterised in that the ion-exchange membrane sheet, when installed in the electrolytic cell, is contacted with liquid medium by charging the liquid medium to the anode compartment(s) of the cell and, after swelling has been effected, the liquid medium is removed from the anode compartment(s) and replaced by the electrolyte to be electrolysed.

7. A method as claimed in claim 6 characterised in that the liquid medium is charged to the anode compartment(s) of the electrolytic cell and contacted with a first face of the ion-exchange membrane sheet, and a further liquid is charged to the cathode compartment(s) of the electrolytic cell and contacted with a second face of the ion-exchange membrane sheet, the further liquid being capable of swelling the membrane to an extent less than the liquid medium charged to the anode compartment(s).

8. A method as claimed in claim 1, 2 or 3 characterised in that ion-exchange membrane sheet is swollen by the liquid medium at or near a first face of the sheet to an extent of at least 50% more than the extent by which the membrane would be swollen by the electrolyte to be electrolysed in the cell.

9. A method as claimed in claim 1, 2 or 3 characterised in that the liquid medium is miscible with water.

10. A method as claimed in claim 1, 2 or 3 characterised in that the electrolyte is aqueous sodium chloride solution and in that the liquid medium is selected from water, methanol, dilute aqueous sodium hydroxide solution, and aqueous lithium chloride solution.

11. A method as claimed in claim 1, 2 or 3 characterised in that the method is effected after the membrane has been installed in an electrolytic cell and after an electrolyte has been electrolysed therein.

* * * * *